US012561439B2

(12) United States Patent
Davidson et al.

(10) Patent No.: US 12,561,439 B2
(45) Date of Patent: Feb. 24, 2026

(54) LOCATION-BASED IHS FUNCTIONALITY LIMITING SYSTEM AND METHOD

(71) Applicant: Dell Products, L.P., Round Rock, TX (US)

(72) Inventors: Jason Davidson, Albany, OR (US); Dominique Prunier, Montreal (CA); Andrew Nepogodin, Round Rock, TX (US); Bridget Cate, Taylors, SC (US); Elie Antoun Jreij, Pflugerville, TX (US); Yun Zhang, Shanghai (CN); Sisir Samanta, Round Rock, TX (US); Ching-Yun Chao, Austin, TX (US); Shibi Panikkar, Bangalore (IN); Maleravalappil Abdulla Mohammad Sadiq, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 132 days.

(21) Appl. No.: 18/340,971

(22) Filed: Jun. 26, 2023

(65) Prior Publication Data

US 2024/0427894 A1 Dec. 26, 2024

(51) Int. Cl.
*G06F 21/57* (2013.01)

(52) U.S. Cl.
CPC ........ *G06F 21/57* (2013.01); *G06F 2221/034* (2013.01); *G06F 2221/2111* (2013.01)

(58) Field of Classification Search
CPC ............... G06F 21/57; G06F 2221/034; G06F 2221/2111
See application file for complete search history.

(56) References Cited

U.S. PATENT DOCUMENTS

| | | | | |
|---|---|---|---|---|
| 9,600,670 | B2 * | 3/2017 | Goss ........................ | G06F 21/57 |
| 9,756,173 | B2 * | 9/2017 | Iyer ........................ | H04W 12/64 |
| 10,552,583 | B2 * | 2/2020 | Piccionelli ............. | G06F 21/10 |
| 10,805,861 | B2 * | 10/2020 | Breaux, III .......... | G06F 3/0227 |
| 11,386,231 | B2 * | 7/2022 | Limaye ................. | H04W 12/08 |
| 2005/0055578 | A1 * | 3/2005 | Wright .................... | G06F 21/32 726/4 |
| 2005/0154873 | A1 * | 7/2005 | Cam-Winget ...... | H04L 63/0435 713/150 |
| 2006/0031830 | A1 * | 2/2006 | Chu ........................ | G06F 21/10 717/174 |
| 2018/0225456 | A1 * | 8/2018 | Barsness ................. | G06F 21/35 |

FOREIGN PATENT DOCUMENTS

| | | | | | |
|---|---|---|---|---|---|
| EP | | 2733656 A1 * | 5/2014 | ............ | H04W 12/08 |
| WO | WO-2019089201 A1 * | | 5/2019 | ............... | G01S 5/00 |

* cited by examiner

*Primary Examiner* — Christopher A Revak

(74) *Attorney, Agent, or Firm* — Fogarty LLP

(57) ABSTRACT

Systems and methods for location-based IHS functionality limiting in an Information Handling System (IHS) are described. In an embodiment, an IHS may include: a host processor; a security processor coupled to the host processor; and a memory coupled to the security processor, the memory having program instructions stored thereon that, upon execution, cause the security processor to: detect a location where the IHS is currently disposed; determine one or more restrictions associated with the detected location, each of the restrictions specifying a limitation to be imparted on a resource of the IHS; and communicate with the IHS to apply the determined restrictions.

20 Claims, 5 Drawing Sheets

220

| LOCATION | REGIONAL CRYPTOGRAPHIC ALGORITHM | MAXIMUM CLOCK SPEED | MAXIMUM CORES |
|---|---|---|---|
| U.S. | SHA3_512 | N/A | 4 |
| RUSSIA | STREEBOG | 2.5 GHZ | N/A |
| CHINA | SM3 | 2.0 GHZ | N/A |
| E.U. | SHA2_384 | N/A | 3 |

LOCATION-BASED IHS FUNCTIONALITY LIMITING SYSTEM AND METHOD

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

SUMMARY

Systems and methods for location-based IHS functionality limiting in an Information Handling System (IHS) are described. In an embodiment, an IHS may include: a host processor; a security processor coupled to the host processor; and a memory coupled to the security processor, the memory having program instructions stored thereon that, upon execution, cause the security processor to: detect a location where the IHS is currently disposed; determine one or more restrictions associated with the detected location, each of the restrictions specifying a limitation to be imparted on a resource of the IHS; and communicate with the IHS to apply the determined restrictions.

According to another embodiment, a location-based IHS functionality limiting method includes the steps of detecting a location where an Information Handling System (IHS) is currently disposed, determining one or more restrictions associated with the detected location, each of the restrictions specifying a limitation to be imparted on a resource of the HIS, and communicating with the IHS to apply the determined restrictions.

According to yet another embodiment, a memory storage device having program instructions stored thereon that, upon execution by an Information Handling System (IHS), cause the IHS to detect a location where the IHS is currently disposed, determine one or more restrictions associated with the detected location, each of the restrictions specifying a limitation to be imparted on a resource of the IHS, and communicate with the IHS to apply the determined restrictions.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

FIG. 3 illustrates an example location to restriction correlation table that may be used by the location-based IHS functionality limiting system to determine one or more restrictions that may be applied to each of several locations.

DETAILED DESCRIPTION

Figure 1:
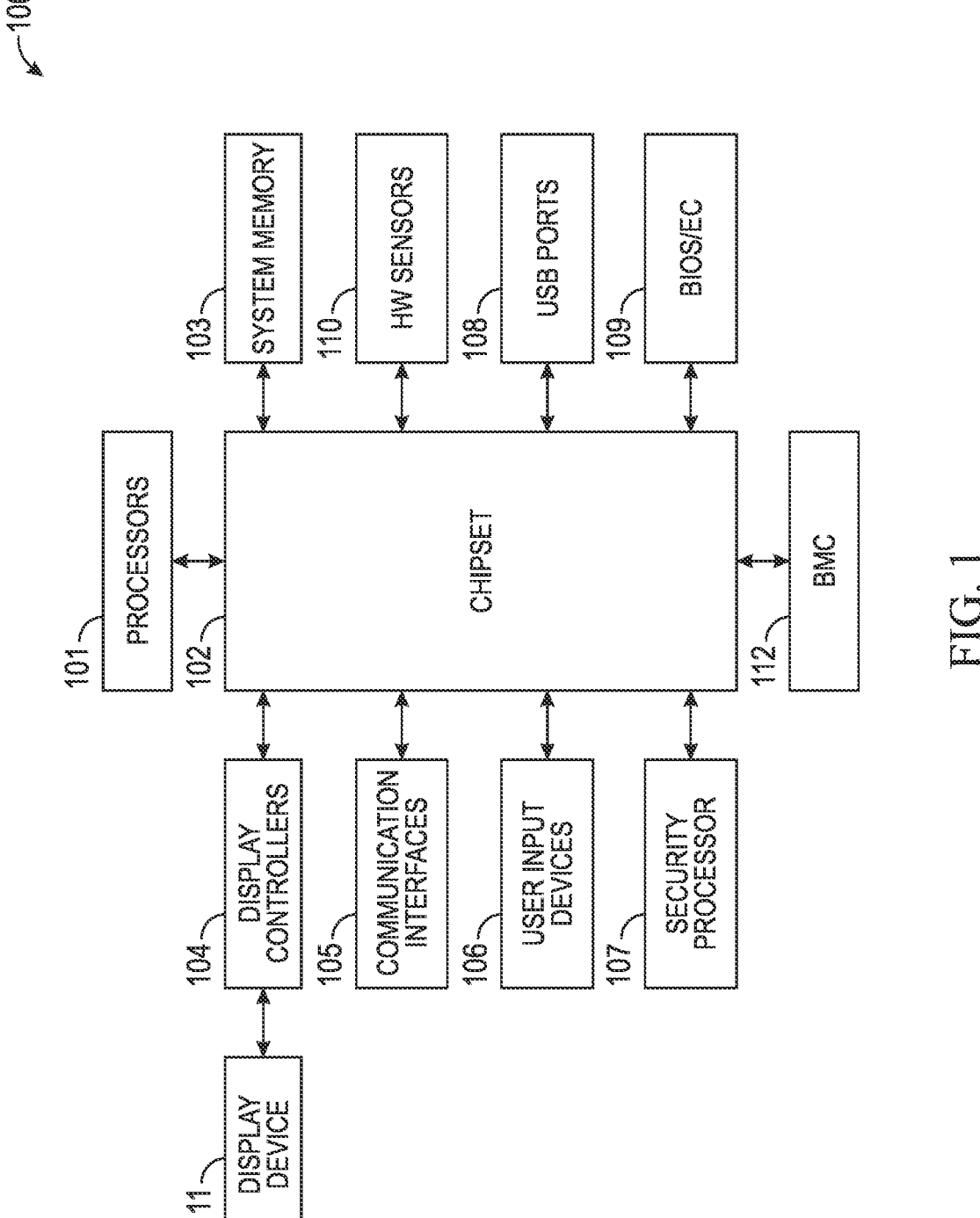
FIG. 1 is a block diagram of components of an example IHS that may implement a location-based IHS functionality limiting system according to one embodiment of the present disclosure.

The present disclosure is described with reference to the attached figures. The figures are not drawn to scale, and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include random access memory (RAM), one or more processing resources such as a central processing unit (CPU) or hardware or software control logic, ROM, and/or other types of nonvolatile memory. Additional components of an IHS may include one or more disk drives, one or more network ports for communicating with external devices as well as various input and output (I/O) devices, such as a keyboard, a mouse, touchscreen and/or a video display. An IHS may also include one or more buses operable to transmit communications between the various hardware components. A more detailed example of an IHS is described with respect to FIG. 1. It should be appreciated that although certain embodiments are discussed in the context of a personal computing device, other embodiments may utilize other types of IHSs.

Certain countries restrict certain computer capabilities or may have specific rules around what sort of hardware they allow within that country. For example, cryptography is the foundation of IHS security, yet cryptographic requirements differ depending upon where in the world an IHS is shipped by its manufacturer because individual countries take it upon themselves to decide which systems to trust. For example, IHSs shipped to U.S. customers include a Trusted Platform Module (TPM), but IHSs shipped to Russia must not have a TPM. Meanwhile, IHSs shipped to China must include a Trusted Cryptographic Module (TCM) instead—yet another part that the manufacturer must maintain. Additionally, certain countries impose restrictions on computer capabilities. For example, export restrictions may have specific rules about the level of performance of an IHS, such as its allowed quantity of processing cores, its maximum clock speed and input/output (I/O) throughput.

In today's manufacturing environment, there is little time to comply with governmental requirements, which often puts sales at risk and can also impact IHS design. In addition, the current turnaround time for firmware updates is much longer than what is necessary to adapt to dynamic regional cryptography policy changes, which requires that multiple regional flavors of firmware be produced (or requires customer configurability, itself a security issue). To address these, and other concerns, various systems and methods described herein may provide a secure location-based IHS functionality limiting system and method that detects an IHS's location and based on the detected location, communicate with the IHS to limit the functionality of the IHS so that it remains compliant with its resident political jurisdiction as will be described in detail herein below.

FIG. 1 is a block diagram of components of an example IHS 100 that may implement a location-based IHS functionality limiting system according to one embodiment of the present disclosure. As depicted, IHS 100 includes processor 101. In various embodiments, IHS 100 may be a single-processor system, or a multi-processor system including two or more processors. Processor 101 may include any processor capable of executing program instructions, such as a PENTIUM series processor, or any general-purpose or embedded processor(s) implementing any of a variety of Instruction Set Architectures (ISAs), such as an x86 ISA or a Reduced Instruction Set Computer (RISC) ISA (e.g., POWERPC, ARM, SPARC, MIPS, etc.).

IHS 100 includes chipset 102 coupled to processor 101. Chipset 102 may provide processor 101 with access to several resources. In some cases, chipset 102 may utilize a QuickPath Interconnect (QPI) bus to communicate with processor 101. Chipset 102 may also be coupled to communication interface(s) 105 to enable communications between IHS 100 and various wired and/or wireless networks, such as Ethernet, WiFi, BT, cellular or mobile networks (e.g., code-division multiple access or "CDMA," time-division multiple access or "TDMA," Long-Term Evolution or "LTE," etc.), satellite networks, or the like. In some cases, communication interface(s) 105 may be used to communicate with devices (e.g., BT speakers, microphones, headsets, etc.). Moreover, interface(s) 105 may be coupled to chipset 102 via a PCIe bus.

Chipset 102 may be coupled to display controller(s) 104, which may include one or more or graphics processor(s) (GPUs) on a graphics bus, such as an Accelerated Graphics Port (AGP) or Peripheral Component Interconnect Express (PCIe) bus. As shown, display controller(s) 104 provide video or display signals to display device 111. In other implementations, any number of display controllers or display devices may be used.

Display device 111 may include Liquid Crystal Display (LCD), Light Emitting Diode (LED), organic LED (OLED), or other thin film display technologies. Display device 111 may include a plurality of pixels arranged in a matrix, configured to display visual information, such as text, two-dimensional images, video, three-dimensional images, etc. In some cases, display device 111 may be provided as a single continuous display, rather than two discrete displays.

Chipset 102 may provide processor 101 and/or display controller(s) 104 with access to system memory 103. In various embodiments, system memory 103 may be implemented using any suitable memory technology, such as static RAM (SRAM), dynamic RAM (DRAM) or magnetic disks, or any nonvolatile/Flash-type memory, such as a solid-state drive (SSD) or the like. System memory 103 may store program instructions that, upon execution by processor 101, enable a collaboration mode for a touchpad coupled or integrated into IHS 100.

Chipset 102 may provide components of IHS 100 (e.g., processor(s) 101) with access to security processor 107. In various embodiments, security processor 107 may include a chip or core dedicated to providing encryption or other security operations to IHS 100. For example, security processor 107 may include a Trusted Platform Module (TPM) configured to securely store encryption keys and measurements that help verify the integrity of IHS 100. Additionally, or alternatively, a TPM-like architecture of security processor 107 may be integrated into processor(s) 101, BIIOS/EC 109, a Baseboard Management Controller (BMC) 112, and the like. Other examples of security processor(s) 107 include, but are not limited to: AMD's PLATFORM SECURITY PROCESSOR (PSP), MICROSOFT's PLUTON, INTEL's CONVERGED SECURITY AND MANAGEMENT ENGINE (CSME), etc.

In some embodiments, security processor 107 may include registers, such as platform configuration registers (PCRs), and secure storage, such as a Non-Volatile Random-Access Memory (NVRAM). Security processor 107 may also include a cryptographic processor that supports various cryptographic capabilities. For example, a pre-boot process implemented by security processor 107 may utilize its cryptographic capabilities to calculate hash values that are based on software and/or firmware instructions utilized by certain core components of IHS 100. These calculated hash values may then be compared against reference hash values that were previously stored in a secure non-volatile memory, such as during factory provisioning of IHS 100. In this manner, security processor 107 may establish a root of trust that includes core components of IHS 100 validated as operating using instructions that originate from a trusted source.

In some embodiments, chipset 102 may also provide access to one or more hard drives, solid state drives, optical drives, or other removable-media drives. In certain embodiments, chipset 102 may also provide access to one or more Universal Serial Bus (USB) ports 108, to which one or more peripheral devices may be coupled (e.g., internal or external webcams, microphones, speakers, etc.).

Chipset 102 may further provide access to one or more user input devices 106, for example, using a super 1/O controller or the like. Examples of user input devices 106 include, but are not limited to, a keyboard, mouse, touchpad, stylus or active pen, totem, etc. Each of user input devices 106 may include a respective controller (e.g., a touchpad may have its own touchpad controller) that interfaces with chipset 102 through a wired or wireless connection (e.g., via communication interfaces(s) 105).

In certain embodiments, chipset 102 may also provide an interface for communications with one or more hardware (HW) sensors 110. Sensors 110 may be disposed on or within the chassis of IHS 100, or otherwise coupled to IHS 100, and may include, but are not limited to: electric, magnetic, radio, optical (e.g., camera, webcam, etc.), infrared, thermal, force, pressure, acoustic, ultrasonic, proximity, position, deformation, bending, direction, movement, velocity, rotation, and/or acceleration sensor(s).

Upon booting of IHS 100, processor(s) 101 may utilize Basic Input/Output System (BIOS) instructions of BIOS/ Embedded Controller (EC) 109 to initialize and test hardware components coupled to IHS 100 and to load an OS for use by IHS 100. BIOS/EC 109 provides an abstraction layer that allows the OS to interface with certain hardware components that are utilized by IHS 100. Via the hardware abstraction layer provided by BIOS/EC 109, software stored in system memory 103 and executed by processor 101 can interface with certain I/O devices that are coupled to IHS 100. The Unified Extensible Firmware Interface (UEFI) was designed as a successor to BIOS. As a result, many modern IHSs utilize UEFI in addition to or instead of a BIOS. As used herein, BIOS/EC 109 is intended to also encompass a UEFI component.

BIOS/EC 109 may be installed as a Trusted Execution Environment (TEE) component to the motherboard of IHS 100. BIOS/EC 109 may implement operations for interfacing with a power adapter in managing power for IHS 100. Such operations may be utilized to determine the power status of IHS 100, such as whether IHS 100 is operating from battery power or is plugged into an AC power source. Firmware instructions utilized by BIOS/EC 109 may be used to provide various core operations of IHS 100, such as power management and management of certain modes of IHS 100 (e.g., turbo modes, maximum operating clock frequencies of certain components, etc.).

In some implementations, a low-power mode of operation may include the S0 low-power idle model, also known as Modern Standby or Connected Standby, which provides an instant on/off user experience and maintains a network connection for certain processes while consuming very little power. These power modes may be entered, for example, when IHS 100 transitions into standby (e.g., "sleep," etc.).

BIOS/EC 109 may also implement operations for detecting certain changes to the physical configuration or posture of IHS 100 and managing the modes of a touchpad or other user input device 106 in different configurations of IHS 100. For instance, where IHS 100 is a 2-in-1 laptop/tablet form factor, BIOS/EC 109 may receive inputs from a lid position or hinge angle sensor (e.g., one or more of HW sensors 110), and it may use those inputs to determine: whether the two sides of IHS 100 have been latched together to a closed position or a tablet position, the magnitude of a hinge or lid angle, etc.

BIOS/EC 109 may be further configured to calculate hashes or signatures that uniquely identify individual components of IHS 100. In such scenarios, BIOS/EC 109 may calculate a hash value based on the configuration of a hardware and/or software component coupled to IHS 100. For instance, BIOS/EC 109 may calculate a hash value based on all firmware and other code or settings stored in an onboard memory of a hardware component. Such hash values may be calculated as part of a trusted process of manufacturing IHS 100 and may be maintained in secure storage as a reference signature. BIOS/EC 109 may later recalculate the hash value for a component and compare it against the reference hash value to determine if any modifications have been made to the component, thus indicating that the component has been compromised. In this manner, BIOS/EC 109 may validate the integrity of hardware and software components installed on IHS 100.

The IHS 100 may also be configured with a Baseboard Management Controller (BMC) 112 for use in managing various resources of the IHS 100. The BMC 112 may include non-volatile memory having program instructions stored thereon that enable remote management of the IHS 100. For example, BMC 112 may enable a user to discover, configure, and manage the IHS 100, setup configuration options, resolve and administer hardware or software problems, and the like. Additionally or alternatively, the BMC 112 may include one or more firmware volumes, each volume having one or more firmware files used by the BIOS' firmware interface to initialize and test components of the IHS 100.

As a non-limiting example of the BMC 112, the integrated DELL Remote Access Controller (iDRAC) from DELL, INC. is embedded within DELL POWEREDGE servers and provides functionality that helps information technology (IT) administrators deploy, update, monitor, and maintain servers with no need for any additional software to be installed. The iDRAC works regardless of OS or hypervisor presence from a pre-OS or bare-metal state because iDRAC is embedded within the IHS 100 from the factory.

In some embodiments, IHS 100 may not include all the components shown in FIG. 1. In other embodiments, IHS 100 may include other components in addition to those that are shown in FIG. 1. Furthermore, some components that are represented as separate components in FIG. 1 may instead be integrated with other components. For example, all or a portion of the operations executed by the illustrated components may instead be executed by components integrated into processor(s) 101 as systems-on-a-chip (SoC). As such, in various embodiments, IHS 100 may be implemented as different classes of computing devices including, but not limited to: servers, workstations, desktops, laptops, appliances, video game consoles, tablets, smartphones, etc.

Figure 2:
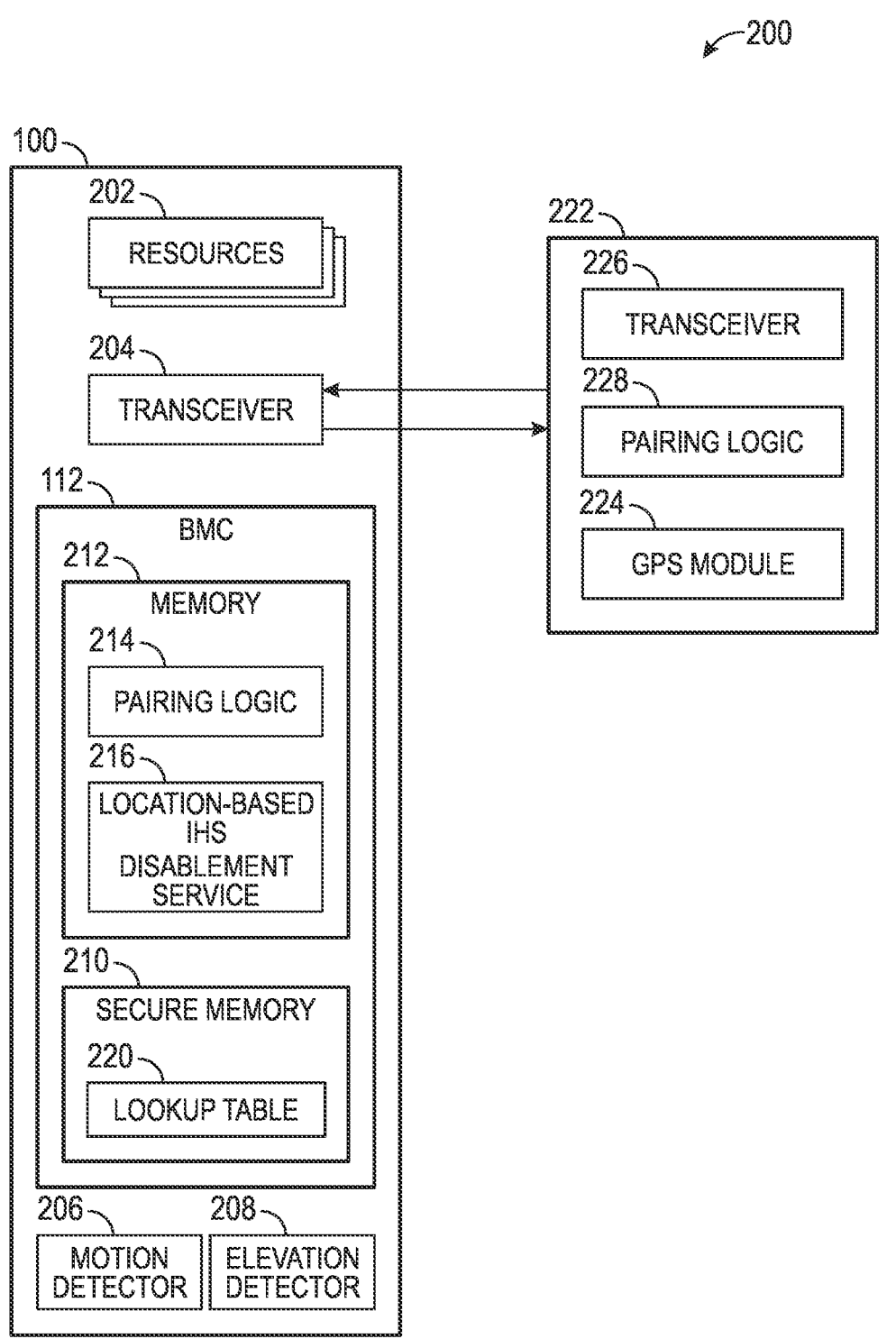
FIG. 2 illustrates an example location-based IHS functionality limiting system that may be implemented on the IHS according to one embodiment of the present disclosure.

FIG. 2 illustrates an example location-based IHS functionality limiting system 200 that may be implemented on the IHS 100 according to one embodiment of the present disclosure. The location-based IHS functionality limiting system 200 includes an IHS 100 configured with one or more resources 202, a short range wireless transceiver 204, a BMC 112, and one or more location detectors, such as a motion detector 206 and/or an elevation detector 208. The BMC 112 is configured with a secure memory 210 that stores a location to restriction correlation table 220, and a memory 212 for storing pairing logic 214 and a location-based IHS functionality limiting service 216. As will be described herein below, the location-based IHS functionality limiting service 216 determines a physical location of the IHS 100, accesses the location to restriction correlation table 220 to determine any limitations to be imposed upon certain resources 202 of the IHS 100, and communicates with the IHS 100 to impose those limitations.

While the present example embodiment of the location-based IHS functionality limiting system 200 is described herein as a dongle 222 that is paired with a single IHS 100, it should be appreciated that in other embodiments, the dongle 222 may be paired or otherwise married to multiple IHSs 100, such as to some, most, or all IHSs 100 configured in a data center. For example, the dongle 222 may be configured with a built-in immutable private key that cannot be spoofed, and can be used for authentication and session setup with multiple IHSs 100. To this end, The IHSs 100 would store the public key corresponding to the private key stored in the dongle 222. A session key may be generated using a Public Key Infrastructure (PKI) handshake procedure in which the location coordinates are transmitted from the dongle 222 to the IHSs 100 after being encrypted with the generated session key. Other communication techniques for securely communicating location information from a single device (e.g., dongle 222) to many IHSs 100 could be used without departing from the spirit and scope of the present disclosure.

The location-based IHS functionality limiting service 216 may detect the current location or movement of the IHS 100 in any suitable manner. In one embodiment, the location-based IHS functionality limiting service 216 may access a motion detector 206 and/or elevation detector 208 to detect that the IHS 100 has been or is being moved to trigger an authorization for any limitations to be imparted to the resources 202 of the IHS 100. In another embodiment, the location-based IHS functionality limiting service 216 may communicate with a Global Positioning System (GPS) module 224 configured in the dongle 222 to obtain the current location, and impose certain resource limitations based on the determined location. In other embodiments, the location-based IHS functionality limiting service 216 may receive location information from a GPS (not shown) configured in the IHS 100 to determine which resource limitations should applied.

In one embodiment, the dongle 222 includes pairing logic 228 for causing the dongle 222 to be securely paired with the IHS 100 using pairing logic 214. For example, the dongle 222 may be paired with the IHS 100 at the factory (e.g., where the IHS 100 is assembled or manufactured) using a security key of the factory such that the dongle 222 is uniquely associated with (e.g., married to) that particular IHS 100 throughout the serviceable life of the IHS 100. Therefore, to pair the IHS 100 with another different dongle 222 would most often require that the IHS 100 be returned to the factory so that it can be paired again with the other dongle 222.

Embodiments of the present disclosure may provide certain benefits when a GPS enabled dongle 222 is used to vouch for the location of the IHS 100. For example, servers, which comprise a type of IHS 100, may be configured in a data center that inhibits Radio Frequency (RF) radiation from entering or leaving its building structure as many building structures are often configured as Faraday cages that block any effective RF radiation passing through its walls and ceiling for security reasons. While the location-based IHS functionality limiting service 216 could otherwise use an GPS internally configured in the IHS 100, the building structure may block its use due to its RF shielding capabilities. The dongle 222 provides a solution to this problem, among others, by enabling temporary separation of the GPS module 224 from the IHS 100 so that a relatively accurate assessment of the location of the IHS 100 may be securely obtained, thus constructing a relatively good level of trust as to its current location. Additional details of how the dongle 222 works or functions will be described in detail herein below.

The resources 202 that may be limited by the location-based IHS functionality limiting service 216 may be any suitable type. For example, the resources 202 to be limited may include the processor(s) 101, display controllers 104, communication interfaces 105, security processor 107, system memory 103, USB ports 108, or even certain portions of the BIOS/EC 109. In one embodiment, the security processor 107 may be configured on a Trusted Platform Module (TPM) such that its level of functionality may be managed by the location-based IHS functionality limiting service 216.

In one embodiment, the security processor 107 may include a superset of all regional cryptographic algorithms available and/or relevant at the time of IHS 100's production. When the IHS 100 is manufactured or serviced (e.g., by an Original Equipment Manufacturer or "OEM"), a factory or service facility IHS (equipped with a hardware security module or "HSM" configured to protect cryptographic keys, lifecycles, and infrastructures) selects one or more regional cryptographic algorithms among the superset of regional cryptographic algorithms to be activated in security processor 107, to the exclusion of all others.

In various implementations, only a factory IHS (i.e., an IHS at an OEM's factory that produces IHS 100 containing security processor 107) may be capable of changing a previous regional cryptographic algorithm selection (e.g., during servicing of IHS 100 following its manufacture). Moreover, because all regional cryptographic algorithms available are included in security processor 107 out of the factory, subsequent changes to which regional cryptographic algorithms should be activated (e.g., in response to governmental policy changes, etc.) can take place independently of and/or without any changes to security processor 107's firmware.

In some cases, regional cryptographic algorithm(s) may be selected, for example, based at least in part upon: a location of the IHSs factory (e.g., for customers who want US-built IHSs, with the US algorithm's activation occurring on US soil); a customer shipping destination (e.g., if a China-built IHS is shipped to Germany, the selection is aligned with EU requirements); and/or customer choice (i.e., the customer selects what algorithms they want used in their product). Certain embodiments may be implemented as part of a "personality module" outside of the security processor's firmware image and can also apply to whole or portions of the firmware image.

FIG. 3 illustrates an example location to restriction correlation table 220 that may be used by the location-based IHS functionality limiting service 216 to determine one or more restrictions that may be applied to each of several locations. In the present embodiment, the locations are political jurisdictions or countries that have established certain restrictions to be placed upon IHSs used within their boundaries. Nevertheless, it is contemplated that embodiments of the present disclosure can be applied to any suitable type of location. For example, the location type may include a premise of an organization, such as a work site with offices where employees use their company issued IHSs 100 during work hours. As such, the table 220 may be populated with entries for a first set of applications that can only be used when the IHS 100 is located at the work site (e.g., via a whitelist), and entries for a second set of applications that are restricted from use at the work site (e.g., via a blocklist). Thus, when the employees are traveling or at home, they may be blocked from using the first set of applications, while being allowed to use the second set of applications. Additionally, it is contemplated that the location to restriction correlation table 220 may be populated with a broad array of differing types of locations, such as one that includes political jurisdictions as well as premises of organizations and other geographical regions.

Referring again to FIG. 3, the location to restriction correlation table 220 includes a location column 302a indicating a particular location, a regional cryptographic algorithm column 302b indicating a particular type of cryptographic algorithm to be correlated with the location, a maximum clock speed column 302c indicating a maximum clock speed that the processors 101 are allowed to run, and a maximum quantity of cores column 302*d* indicating a maximum allowed quantity of cores that are allowed to be simultaneously used at the location. When the location-based IHS functionality limiting service 216 obtains location information, it accesses the location to restriction correlation table 220 to determine any restrictions that are to be applied for that location, and communicates with the IHS 100 to implement those restrictions.

In one embodiment, the location to restriction correlation table 220 is stored in the secure memory 210 portion of the BMC 112 such that it is only accessible by users (e.g., vendor of the IHS 100) possessing the keys used to secure the secure memory 210 portion. In another embodiment, the location to restriction correlation table 220 may be stored in a secure memory portion of the IHS 100. Such a feature may be useful in cases where no BMC 112 exists on the IHS 100.

Figure 4:
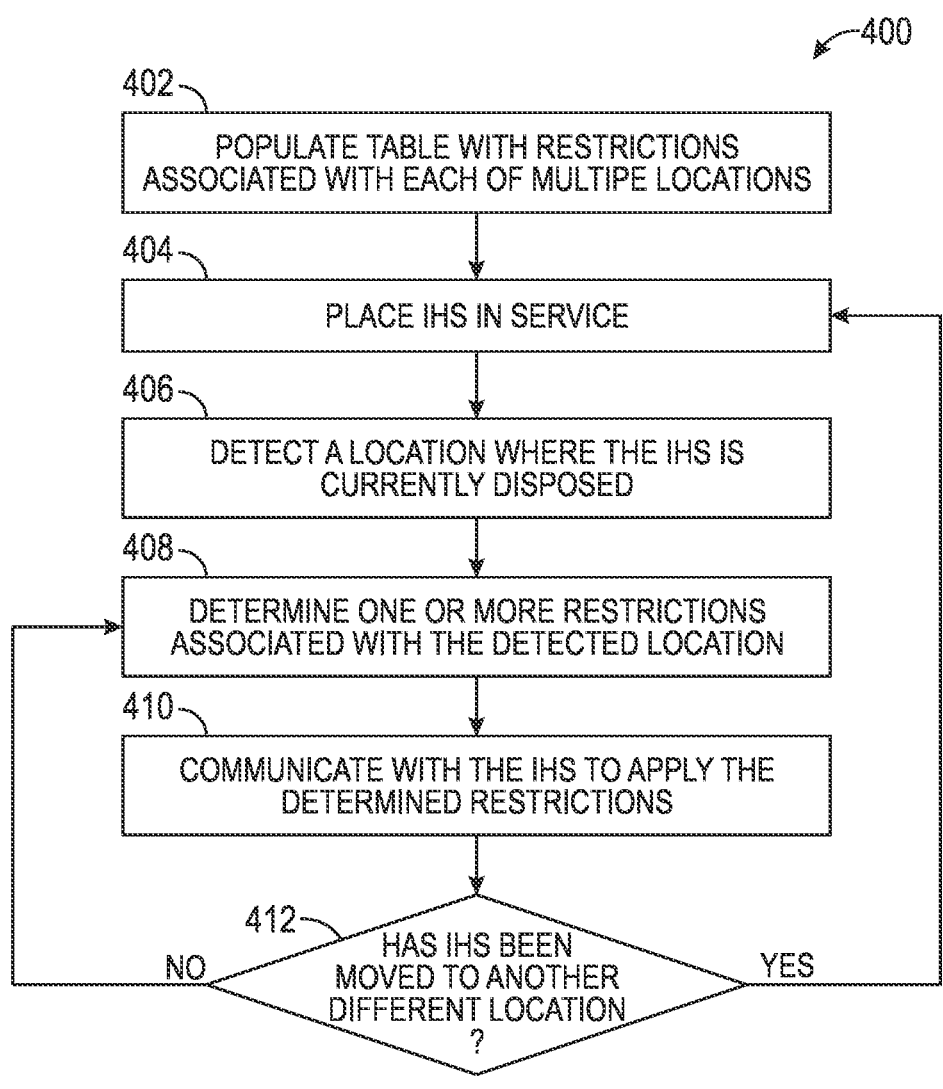
FIG. 4 illustrates a flow diagram showing one embodiment of an example location-based IHS functionality limiting method according to one embodiment of the present disclosure.

FIG. 4 illustrates a flow diagram showing one embodiment of an example location-based IHS functionality limiting method 400 according to one embodiment of the present disclosure. Additionally or alternatively, some, most, or all steps of the location-based IHS functionality limiting method 400 may be performed by the location-based IHS functionality limiting service 216 as described above with reference to FIG. 2. In one embodiment, the method 400 may be performed each time the IHS 100 is re-booted. In another embodiment, the method 400 may be performed whenever movement of the IHS 100 is detected, such as via the motion detector 206, elevation detector 208, and/or GPS module 224. In yet another embodiment, the method 400 may be performed at ongoing intervals (e.g., periodically) or in response to a manual request, such as when a user or administrator would like to ensure compliance of the IHS 100 to the restrictions allocated for that location. Additionally, while the location-based IHS functionality limiting method 400 describes a single dongle 222 being paired with a single IHS 100, it should be appreciated that the location-based IHS functionality limiting method 400 may be performed by a single dongle 222 that is paired with multiple IHSs 100, such as with multiple IHSs 100 configured in a data center.

Initially at step 402, the method 400 populates the location to restriction correlation table 220 with restrictions associated with each of multiple locations. For example, the vendor, during assembly or manufacture of the IHS 100, may populate the location to restriction correlation table 220 with the latest known location compliance restrictions, and securely store the location to restriction correlation table 220 in a memory of the IHS 100, such as a secure memory 210 of the BMC 112 configured in the IHS 100. The location to restriction correlation table 220 may be populated with any suitable quantity of type of location based restrictions. For example, the location to restriction correlation table 220 may be populated with restrictions associated with political jurisdictions (e.g., countries), and/or organizational premises of one or more corporations, schools, clubs, and the like. Thereafter at step 404, the IHS 100 is placed in service. That is, the IHS 100 may be installed in its desired location, such as being installed in a computing rack configured within a data center, and turned on.

At step 406, the method 400 detects a location where the IHS 100 is currently configured. For example, the method 400 may communicate with either of a motion detector 206, an elevation detector 208, a GPS module 224, and/or other location detecting device to determine the current location of the IHS 100. In one embodiment, the method 400 may use a last known location technique in which the method 400 accepts that last location measurement obtained by the dongle 222 before GPS reception is lost. In this particular case, the method 400 may apply another time window at which the last known location remains valid. For example, if the last known location technique is used, provide a time window (e.g., approximately 5 to 10 minutes) to leave ample time at which the IHS 100 can be installed and powered on when placed in a remote location, such as an underground bunker in which the user can go down an elevator or other ambulatory means to access the IHS 100 and authenticate its location.

The method 400 then determines one or more restrictions associated with the detected location at step 408. For example, the method 400 may access a location to restriction correlation table 220 stored in a secure memory of the IHS 100 to determine which restrictions are to be applied. At step 410, the method 400 communicates with the IHS 100 to apply the determined restrictions. For example, the method 400 may control the processor 101 to limit its use to a certain quantity of processing cores that are fewer than its total quantity of processing cores. For another example, the method 400 may control the security processor 107 to use a particular regional cryptographic algorithm based upon the detected location.

At this point, the IHS 100 has been booted and is providing its services in a normal manner. Later on, at step 412, the method 400 determines whether the IHS 100 has been moved to a location different from that detected above at step 404. If so, processing continues at step 404 to again determine the current location of the IHS 100, and apply restrictions appropriate for that location; otherwise, processing continues at step 408 in which the IHS 100 continues to provide its services in the normal manner.

The steps described above may be performed throughout the serviceable life of the IHS 100. Nevertheless, when use of the location-based IHS functionality limiting method 400 is no longer needed or desired, the process ends.

Although FIG. 4 describes an example method 400 that may be performed to maintain compliance with relevant local restrictions for operation of the IHS 100, the features of the method 400 may be embodied in other specific forms without deviating from the spirit and scope of the present disclosure. For example, the method 400 may perform additional, fewer, or different operations than those described in the present examples. For another example, the method 400 may be performed in a sequence of steps different from that described above. As yet another example, certain steps of the method 400 may be performed by other components in the IHS 100 other than those described above.

Figure 5:
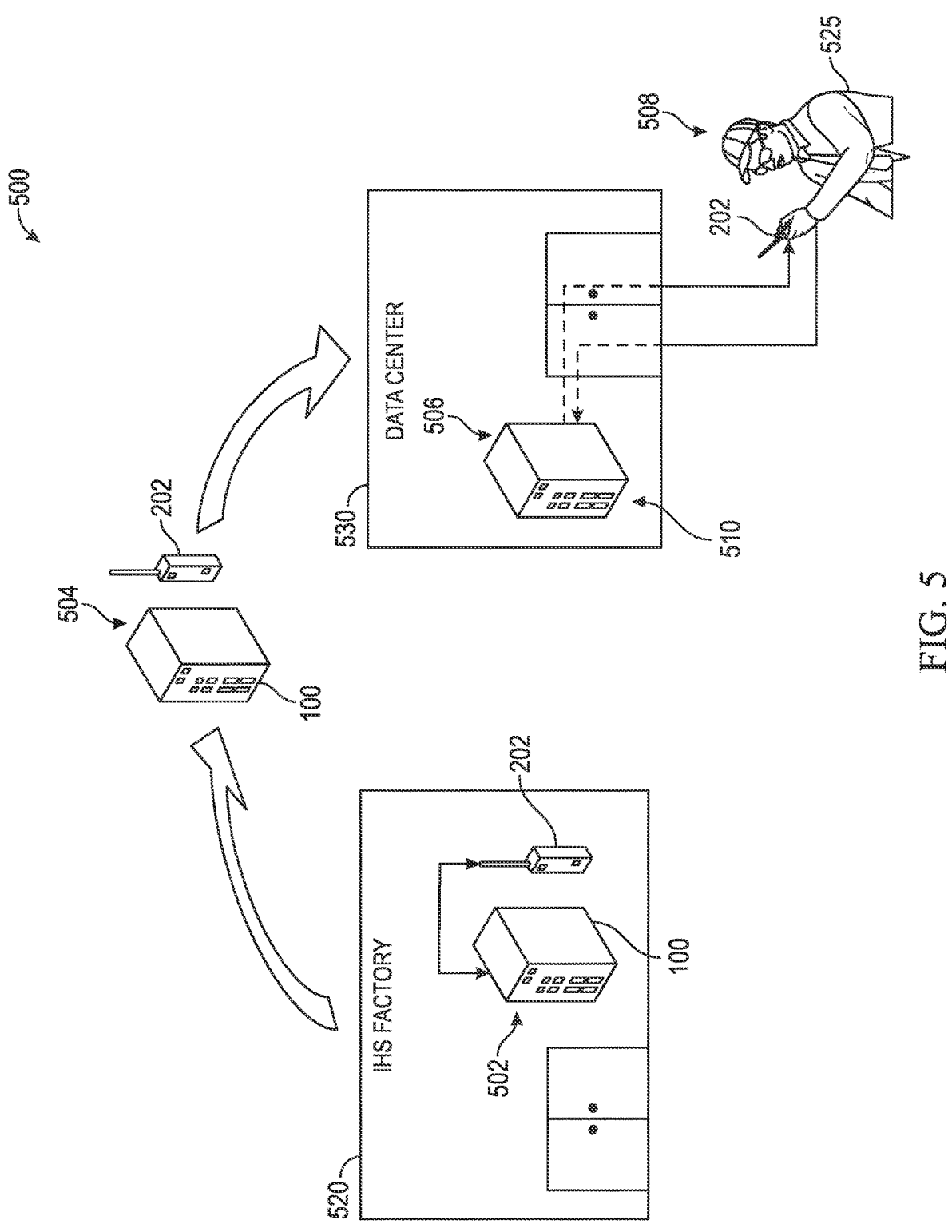
FIG. 5 illustrates an example location determining procedure that may be implemented with the GPS enabled dongle to provide a relatively high degree of trust with regard to the location of an IHS according to one embodiment of the present disclosure.

FIG. 5 illustrates an example location determining procedure 500 that may be implemented with the GPS enabled dongle 222 to provide a relatively high degree of trust with regard to the location of an IHS 100 according to one embodiment of the present disclosure. As mentioned previously, GPS devices that require good reception in order to accurately determine its present location, are often hindered when placed in certain buildings, such as data centers that are often configured as a Faraday cage to purposefully limit the amount of RF radiation coming into and going out of the building. As such, the dongle 222 may temporarily be separated from its paired IHS 100 to obtain an accurate measurement of the location so that the location of the IHS 100 can be accurately ascertained.

Initially at step 502, the dongle 222 is paired with the IHS 100 at a factory 520 where the IHS 100 is manufactured or otherwise assembled into its final form for use by a user. The paired IHS 100 and dongle 222 are then shipped to a user, which in the particular example embodiment, is a data center 530 at step 504. At step 506, the IHS 100 is installed in the data center 530, such as by mounting the IHS 100 in a computing rack and connecting the IHS 100 to an available power source.

Once electrical power is applied to the IHS 100 it may, during its bootstrap process, issue a request to the user 525 (e.g., via a popup window on a display), to move the dongle 222 to a location where GPS RF can be received to obtain an accurate location measurement. Thus at step 508, the user 525 moves the dongle 222 to another location with sufficient GPS signal reception to obtain an accurate location measurement. For example, the user 525 may go outside of the data center 530 to obtain an accurate location measurement, or as another example, the user 525 may move towards a window in the data center where GPS reception may be improved. At step 510, the user 525 moves the dongle 222 back in relatively close proximity to the IHS 100 so that the measured location can be transferred to the IHS 100 to be used by the location-based IHS functionality limiting service 216. When the location-based IHS functionality limiting service 216 receives the location measurement from the dongle 222, it may then apply any location-based restrictions such as described above with reference to FIGS. 3 and 4.

In one embodiment, the wireless link between the transceiver 204 configured in the IHS 100 and the transceiver 226 configured in the dongle 222 is a short range wireless link that is only good over a relatively short distance (e.g., approximately 2 inches to 30 feet of separation). The short range may alleviate interference caused by wireless communication links from other paired IHSs 100/dongle 222 combinations, and mitigate spoofing attacks where an illicitly used dongle may be used to spoof the actual location of the IHS 100. Examples of suitable types of short range wireless links may include a near-field communication (NFC) link, an infrared communication link, a Bluetooth link, and an Ultra-Wide Band (UWB) link to name a few.

In another embodiment, logic within the location-based IHS functionality limiting service 216 or dongle 222 may be configured with a time window to ensure that the dongle's location is not spoofed. That is, the dongle 222 may, after acquiring a valid location measurement from the GPS module 224 at step 508, provide a short time window (e.g., 2 to 10 minutes) in which the location measurement is provided to the IHS 100 at step 510. Should the user 525 not complete steps 508 and 510 within the specified time window, the location-based IHS functionality limiting system 200 may require that the user 525 to repeat the aforementioned steps to provide location-based authorization for the IHS 100 using the GPS-enabled dongle 222.

In many implementations, systems and methods described herein may be incorporated into a wide range of electronic devices including, for example, computer systems or Information Technology (IT) products such as servers, desktops, laptops, memories, switches, routers, etc.; telecommunications hardware; consumer devices or appliances such as mobile phones, tablets, wearable devices, IoT devices, television sets, cameras, sound systems, etc.; scientific instrumentation; industrial robotics; medical or laboratory electronics such as imaging, diagnostic, or therapeutic equipment, etc.; transportation vehicles such as automobiles, buses, trucks, trains, watercraft, aircraft, etc.; military equipment, etc. More generally, these systems and methods may be incorporated into any device or system having one or more electronic parts or components.

To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks. The program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices.

Reference is made herein to "configuring" a device or a device "configured to" perform some operation(s). It should be understood that this may include selecting predefined logic blocks and logically associating them. It may also include programming computer software-based logic of a retrofit control device, wiring discrete hardware components, or a combination of thereof. Such configured devices are physically designed to perform the specified operation (s).

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS), that comprises:

a processor; and a memory coupled to the processor, the memory configured to store program instructions that, upon execution, cause the processor to:

detect a location where the IHS is disposed, based at least in part on location data obtained external to the IHS by a dongle paired with the IHS, wherein the dongle comprises a location sensor, and wherein the location data is encrypted by the dongle with a session key derived from a key pair that comprises a private key stored in the dongle and a public key stored in the IHS;

determine one or more restrictions associated with the detected location, wherein each of the one or more restrictions specifies at least one limitation to be imparted on a resource of the IHS; and communicate with the IHS to apply the determined one or more restrictions.

2. The IHS of claim 1, wherein the program instructions, upon execution, further cause the processor to store the restrictions in a lookup table.

3. The IHS of claim 2, wherein the program instructions, upon execution, further cause the processor to store the lookup table in a secure memory portion of the IHS.

4. The IHS of claim 2, wherein the program instructions, upon execution, further cause the processor to store the lookup table in a secure memory portion of a Baseboard Management Controller (BMC) configured in the IHS.

5. The IHS of claim 4, wherein the program instructions, upon execution, further cause the processor to update the lookup table when a firmware of the BMC is updated.

6. The IHS of claim 1, wherein the program instructions are executed at least in part by a security processor configured in the IHS.

7. The IHS of claim 1, wherein the at least one limitation further comprises at least one of a regional cryptographic algorithm to be used in the detected location, a maximum quantity of allowed processing cores, a maximum allowed clock speed, a feature or capability of a display controller, a feature or capability of a communication interface, a feature or capability of a security processor, a feature or capability of a memory, a feature or capability of a USB port, a feature or capability of a Basic Input/Output System (BIOS), a feature or capability of an Embedded Controller (EC), or a feature or capability of a Graphics Processing Unit (GPU).

8. The IHS of claim 1, wherein the location has a type that comprises at least one of a political jurisdiction or a premise of an organization.

9. A location-based Information Handling System (IHS) functionality limiting method comprising:

detecting a location where an IHS is disposed, based at least in part on receiving encrypted location data obtained external to the IHS by a dongle paired with the IHS, wherein the dongle comprises a location sensor, and wherein the location data is encrypted by the dongle with a session key derived from a key pair comprising a private key stored in the dongle and a public key stored in the IHS, using an IHS processor;

determining one or more restrictions associated with the detected location, each of the one or more restrictions specifying a limitation to be imparted on a resource of the IHS, wherein the one or more restrictions comprise deactivation of at least one feature or capability of at least one of: a Central Processing Unit (CPU), a Graphics Processing Unit (GPU), or a cryptographic algorithm, based at least in part on the detected location, using the IHS processor; and communicating with the IHS to apply the determined one or more restrictions, using the IHS processor.

10. The location-based IHS functionality limiting method of claim 9, further comprising storing the restrictions in a lookup table, using the IHS processor.

11. The location-based IHS functionality limiting method of claim 10, further comprising storing the lookup table in a secure memory portion of the IHS.

12. The location-based IHS functionality limiting method of claim 10, further comprising storing the lookup table in a secure memory portion of a Baseboard Management Controller (BMC) configured in the IHS.

13. The location-based IHS functionality limiting method of claim 12, further comprising updating the lookup table when a firmware of the BMC is updated.

14. A memory storage device configured to store program instructions that, upon execution by a processor configured in an Information Handling System (IHS), cause the IHS to perform operations that comprise:

detect a location where the IHS is disposed, based at least in part on encrypted location data received from a dongle paired with the IHS, wherein the dongle comprises a location sensor, and wherein the location data was obtained external to the IHS and encrypted by the dongle with a session key derived from a key pair that comprises a private key stored in the dongle and a public key stored in the IHS;

determine one or more restrictions associated with the detected location, wherein each of the one or more restrictions specifies a limitation to be imparted on a resource of the IHS, wherein the one or more restrictions comprise deactivation of at least one feature or capability of the resource of the IHS that comprises at least one of: a Central Processing Unit (CPU), a Graphics Processing Unit (GPU), a cryptographic algorithm, a display controller, a communication interface, a security processor, a memory, a USB port, a Basic Input/

Output System (BIOS), or an Embedded Controller (EC), based at least in part on the detected location; and communicate with the IHS to apply the determined one or more restrictions.

15. The memory storage device of claim 14, wherein further program instructions, upon execution, further cause the processor to store the restrictions in a lookup table.

16. The memory storage device of claim 15, wherein further program instructions, upon execution, further cause the processor to store the lookup table in a secure memory portion of the IHS.

17. The memory storage device of claim 15, wherein further program instructions, upon execution, further cause the processor to store the lookup table in a secure memory portion of a Baseboard Management Controller (BMC) configured in the IHS.

18. The memory storage device of claim 17, wherein further program instructions, upon execution, further cause the processor to update the lookup table when a firmware of the BMC is updated.

19. The memory storage device of claim 14, wherein the program instructions are executed at least in part by a security processor configured in the IHS.

20. The memory storage device of claim 14, wherein the location has a type that comprises at least one of a political jurisdiction or a premises of an organization.

*   *   *   *   *